United States Patent [19]
Suzuki et al.

[11] Patent Number: 5,649,251
[45] Date of Patent: Jul. 15, 1997

[54] CAMERA

[75] Inventors: Tatsuya Suzuki, Tokyo; Yasuo Yamazaki, Hino, both of Japan

[73] Assignee: Olympus Optical Co., Ltd., Tokyo, Japan

[21] Appl. No.: 357,105

[22] Filed: Dec. 16, 1994

[30]     Foreign Application Priority Data

Dec. 22, 1993  [JP]  Japan .................. 5-325317

[51] Int. Cl.⁶ .................................................. G03B 17/04
[52] U.S. Cl. ................................... 396/341; 396/344
[58] Field of Search ................................ 354/158, 187, 354/191, 208; 396/341, 344

[56]               References Cited

U.S. PATENT DOCUMENTS

| 2,109,807 | 3/1938 | Tajima . | |
|---|---|---|---|
| 2,578,111 | 12/1951 | Turner et al. . | |
| 2,886,066 | 5/1959 | Hansen . | |
| 3,489,071 | 1/1970 | Mohr et al. . | |
| 3,665,832 | 5/1972 | Harvey | 95/39 |
| 4,095,246 | 6/1978 | Kellner | 354/187 |
| 4,261,658 | 4/1981 | Uchiyama et al. | 354/126 |
| 4,662,734 | 5/1987 | Nishi | 354/187 |
| 5,014,077 | 5/1991 | Yomogizawa et al. | 354/187 |
| 5,084,721 | 1/1992 | Burnham | 354/187 |

FOREIGN PATENT DOCUMENTS

| 80025 | 5/1977 | Japan . |
| 99508 | 7/1980 | Japan . |
| 115733 | 6/1983 | Japan . |
| 22639 | 2/1987 | Japan . |

*Primary Examiner*—Safet Metjahic
*Assistant Examiner*—Daniel Chapik
*Attorney, Agent, or Firm*—Louis Weinstein

[57]               ABSTRACT

In a camera of this invention, a lens barrel including a photographing lens built therein and an aperture opening formed in a camera body are coupled to each other by a light-shield unit in a light-tight manner. The light-shield unit comprises a bellows member made of rubber, sheet, cloth or other material capable of shielding light, which is folded to have top and bottom creases in the spiral form, and a spiral skeleton member comprising a linear spring and fitted to the inner side of a portion of the bellows member which defines the top crease. The skeleton member prevents a flexion of the bellows member, thereby preventing the bellows member from interfering with the flux of photographing light coming through the lens.

13 Claims, 7 Drawing Sheets

CAMERA

BACKGROUND OF THE INVENTION

1. Field of the Invention

The present invention relates to a camera, and more particularly to a camera including, light-shield means which is between an aperture opening of a camera body and a lens barrel, and is able to extend and contract in unison with movement of the lens barrel.

2. Related Art Statement

Heretofore, there have been proposed a variety of cameras each including, light-shield means which is between an aperture opening of a camera body and a lens barrel, and is able to extend and contract in unison with movement of the lens barrel.

For example, Japanese Utility Model Laid-Open No. 62-22639 discloses the structure of an extensible/contractible bellows for a camera which bellows is in a tapered tubular form having a rectangular section with its base end attached to a camera body and its tip end attached to a lens holder, and has four side surfaces each folded inward and outward alternately, wherein the bellows includes reinforcements made of an elastic linear material and disposed along outer ridges of the folded side surfaces. The disclosed bellows structure is employed in an instant camera so that camera can be folded up or set up when respectively put out of or into operation.

However, the bellows disclosed in Japanese Utility Model Laid-Open No. 62-22639 is intended to shield light by being extended or contracted when the camera is respectively folded up or set up, but it does not take into consideration zooming movement or the like. Accordingly, the disclosed bellows is not suitable for light-shielding of a lens barrel and an aperture of a lens shutter camera provided with zooming and focusing devices.

Also, Japanese Utility Model Laid-Open No. 58-115733 discloses a box-shaped bellows which has four ridges lying substantially in the extending direction in a position where the bellows is fully extended, wherein triangular folded portions are provided along the four ridges in alternate relation, and the folded portions locating in each surface defined pairs of the adjacent four ridges are arranged to be asymmetrical with respect to a central axis of the surface in the extending direction. The bellows thus constructed can be folded up into a smaller space.

In Japanese Utility Model Laid-Open No. 58-115733, however, no consideration is given as to how to prevent a flexion of the bellows.

Further, Japanese Patent Laid-Open No. 52-80025 discloses a camera of telescopic cylinder type that a light-shield cylinder for coupling a lens barrel and a camera body is provided in a portion of the camera rearwardly of the lens barrel, the light-shield cylinder comprising two light-shield cylinder members which are telescopically fitted to each other to be relatively movable in the direction of an optical axis, whereby the light-shield cylinder can be extended and contracted. The two light-shield cylinder members are dimensioned such that a cross-sectional area taken perpendicular to the optical axis, through which the flux of photographing light passes, is larger at the position closer to a film plane and is smaller at the position closer to a lens.

In the camera disclosed in Japanese Patent Laid-Open No. 52-80025, however, because the cross-sectional area of the light-shield cylinder is smaller in the position closer to the lens, an angle viewing from an image point on the film plane to the exit pupil, i.e., an angle h1 formed by the photographing light as indicated in FIG. 14, becomes also small. This raises the problem that a bright lens having a large aperture cannot be employed.

Moreover, Japanese Utility Model Publication No. 62-35083 discloses an intermediate ring (adapter) for close-range photographing which is attached to a lens mount surface of a single-lens reflex camera with a photographing lens attached to its front end. The disclosed intermediate ring has a manually operable cylinder disposed on the outermost peripheral side, and comprises a plurality of cylinders slidable in the direction of an optical axis, allowing the ring to be extended and contracted by manual operation. The plurality of slidable cylinders have respective engaging portions so that they are axially moved through mutual engagement.

However, because the structure disclosed in Japanese Utility Model Publication No. 62-35083 is not intended for being built in the camera, but for an adapter externally attached to the mount surface, most part of the ring is appeared outward. In particular, a large portion of outer circumstances of the cylinders is exposed to the outside for enabling manual operation, and steps between the plurality of cylinders fitted to each other in an extensible/contractible manner are visible from the outside, resulting in a complicated appearance.

OBJECTS AND SUMMARY OF THE INVENTION

A first object of the present invention is to provide a camera in which the space between a lens barrel and an aperture opening of a camera body can be surely shielded against light.

A second object of the present invention is to provide a camera in which the space between a lens barrel and an aperture opening of a camera body can be surely shielded against light, and which can prevent light-shield means from interfering with light upon its flexion.

A third object of the present invention is to provide a camera which can prevent from a lens barrel from wobbling.

A fourth object of the present invention is to provide a camera including light-shield means which can prevent internal reflection.

A fifth object of the present invention is to provide a camera which is suitable for use of a photographing optical system with a large aperture.

A sixth object of the present invention is to provide a camera which has a neat configuration appearance.

In summary, the present invention resides in a camera in which the space between an aperture opening formed in a camera body and a movable lens barrel including a photographing lens built therein is shielded against light in a light-tight manner, the camera comprising light-shield means disposed to couple the aperture opening of the camera body and the lens barrel to each other, the light-shield means being extensible and contractible in unison with movement of the lens barrel, and light-shield means including shape holding means disposed in the light-shield means to prevent the light-shield means from interfering with the flux of photographing light upon its flexion.

These as well as other objects and advantages of the present invention will become further apparent from the following detailed explanation.

DETAILED DESCRIPTION OF THE PREFERRED EMBODIMENTS

Hereinafter, preferred embodiments of the present invention will be described with reference the accompanying drawings.

Figure 1:
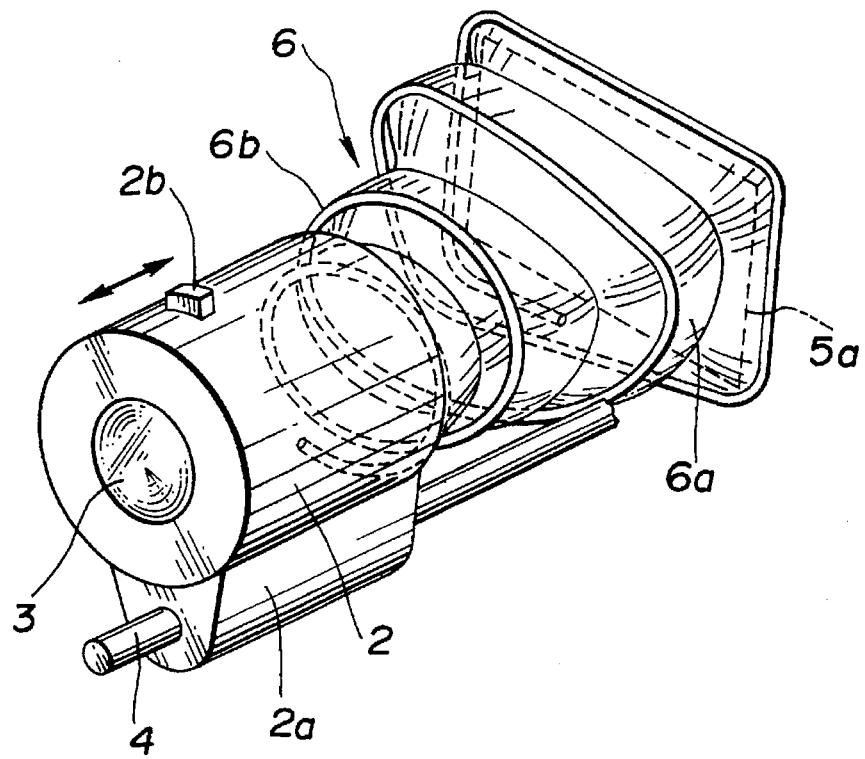
FIG. 1 is a perspective view of light-shield means for coupling a lens barrel and an aperture opening of a camera body in a camera according to a first embodiment of the present invention.
Figure 2:
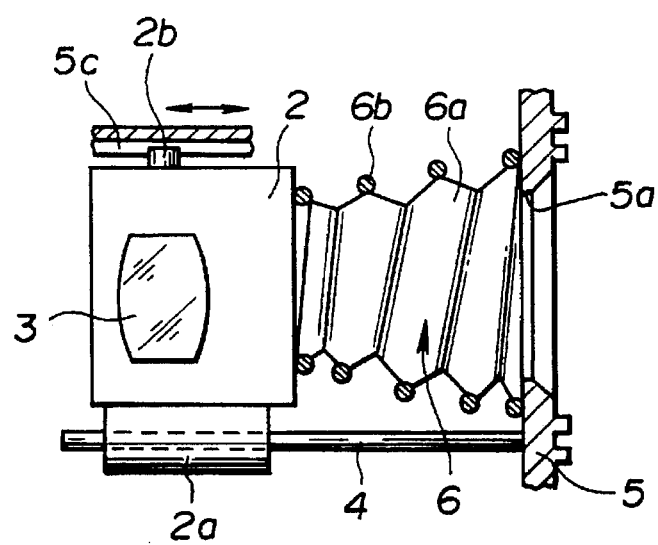
FIG. 2 is a sectional view of the light-shield means for coupling the lens barrel and the aperture opening of the camera body in the camera according to the first embodiment.

FIGS. 1 and 2 show a first embodiment of the present invention.

In a camera of the first embodiment, a lens barrel 2 with a photographing lens 3 built therein and an aperture opening 5a formed in a camera body 5 are coupled to each other by light-shield means 6 in a light-tight manner.

The lens barrel 2 has an engagement boss 2b on its upper circumferential surface which engages in a guide groove 5c to restrict movement of the lens barrel 2 for preventing it from turning about an optical axis when shifted forward, and a projection 2a on its lower circumferential surface through which a support shaft 4 is inserted so that the lens barrel 2 can be longitudinally moved in the direction of the optical axis along the support shaft 4 by drive means (not shown) during operations such as zooming and focusing.

The light-shield means 6 comprises a bellows member 6a made of rubber, sheet, cloth or other material capable of shielding light, which is folded outward and inward along spiral lines, i.e., which is folded to have top and bottom creases in the spiral form, and a spiral skeleton member 6b fitted to the inner side of a portion of the bellows member 6a which defines the top crease.

The skeleton member 6b serving as extensible/contractible state holding means comprises a coiled linear spring to prevent a flexion of the bellows member 6a, thereby preventing the bellows member 6a from interfering with the flux of photographing light coming through the lens 3.

While the skeleton member 6b is assembled in place by fitting in this embodiment, it may be incorporated by the use of rubber insert molding. This modified case is more advantageous from the viewpoint of suppressing internal reflection in the bellows member.

When the aperture opening 5a of the camera body 5 has a size of 24 mm height and 36 mm width, for example, and the lens barrel 2 has a cylindrical shape, the cross-sectional shape of the light-shield means 6 taken in a plane vertical to the optical axis is such that the cross-section is substantially rectangular in a portion close to the aperture opening 5a, changes gradually from a substantially rectangular shape to a substantially circular shape as the position approaches the lens barrel 2 from the aperture opening 5a, and then substantially circular in a portion close to the lens barrel 2.

With the first embodiment described above, since the lens barrel and the aperture opening are coupled to each other in a light-tight manner for shielding light, there occurs no leakage of light and hence no exposure error on a film due to the leaked light. Also, with the combined use of the skeleton member, the bellows member is not deformed to such an extent as to interfere with the light, resulting in no risk of blocking part of the light. Further, in the case of a coiled spring used as the skeleton member, since the lens barrel is resiliently urged in the direction of the optical axis, the lens barrel is prevented from wobbling in the direction of the optical axis.

As a result, there can be obtained a camera in which the region between the lens barrel and the aperture opening of the camera body can be surely shielded from light, and the bellows member is prevented from interfering with the light upon its flexion.

Figure 3:
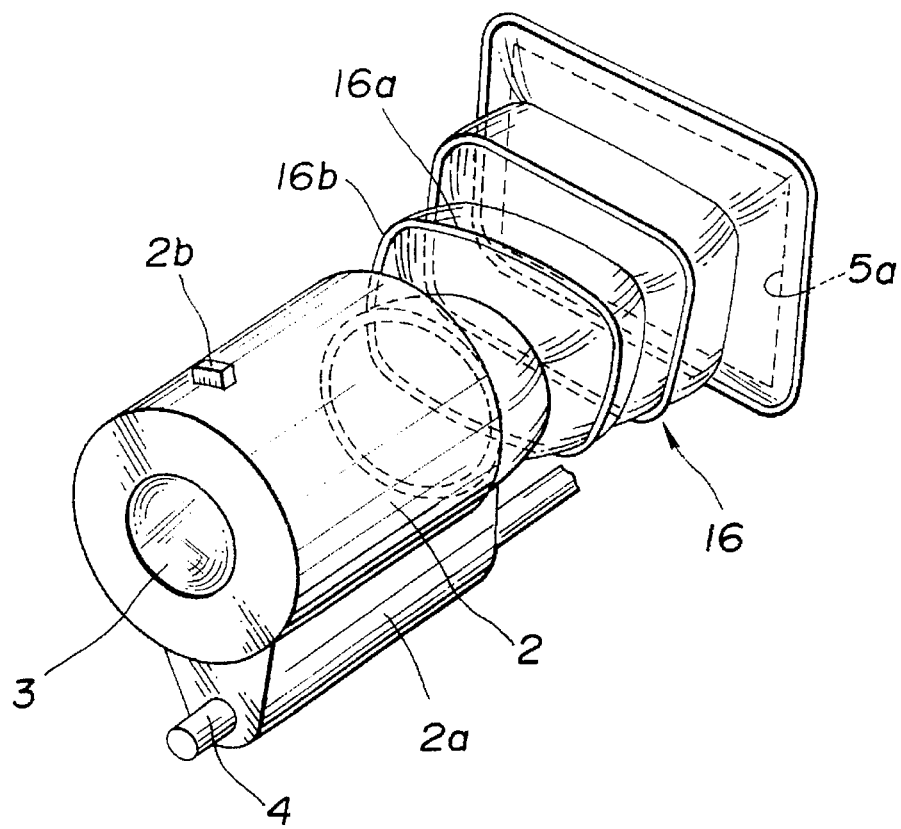
FIG. 3 is a perspective view of light-shield means for coupling a lens barrel and an aperture opening of a camera body in a camera according to a second embodiment of the present invention.
Figure 4:
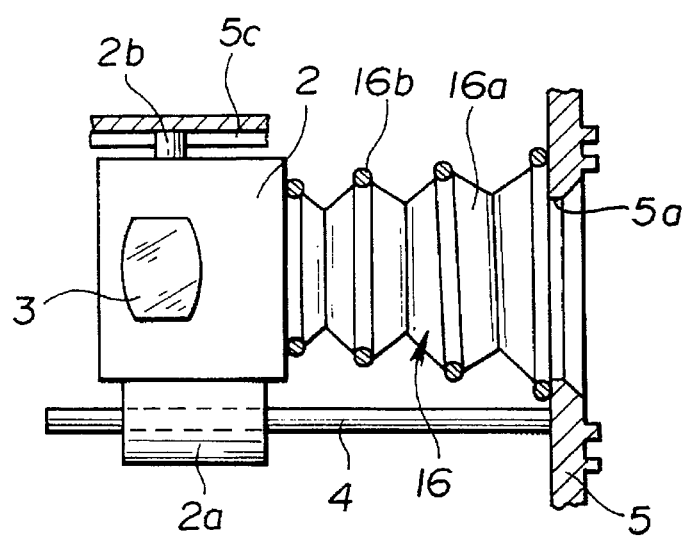
FIG. 4 is a sectional view of the light-shield means for coupling the lens barrel and the aperture opening of the camera body in the camera according to the second embodiment.

FIGS. 3 and 4 show a second embodiment of the present invention. In the second embodiment, identical parts to those in the first embodiment above are not explained here and only a points of difference therefrom will be primarily described below.

The structural relationship of coupling the lens barrel 2 and the aperture opening 5a of the camera body 5 by bellows-shaped light-shield means 16 is basically the same as in the above first embodiment.

The light-shield means 16 comprises a bellows member 16a made of rubber, sheet, cloth or other material capable of shielding light, which is folded plural times, i.e., which is folded to have top and bottom creases positioned successively side by side, and a plurality of ring-shaped skeleton members 16b fitted respectively to the inner side of the top creases of the bellows member 16a.

When the lens barrel 2 has a cylindrical shape as shown, the cross-sectional shape of the light-shield means 16, including the skeleton member 16b, taken in a plane vertical to the optical axis is such that the cross-section is substantially rectangular in a portion close to the aperture opening 5a, changes gradually from a substantially rectangular shape to a substantially circular shape as the position approaches the lens barrel 2 from the aperture opening 5a, and then substantially circular in a portion close to the lens barrel 2.

The second embodiment thus constructed can also provide substantially similar advantages as in the above first embodiment.

Figure 5:
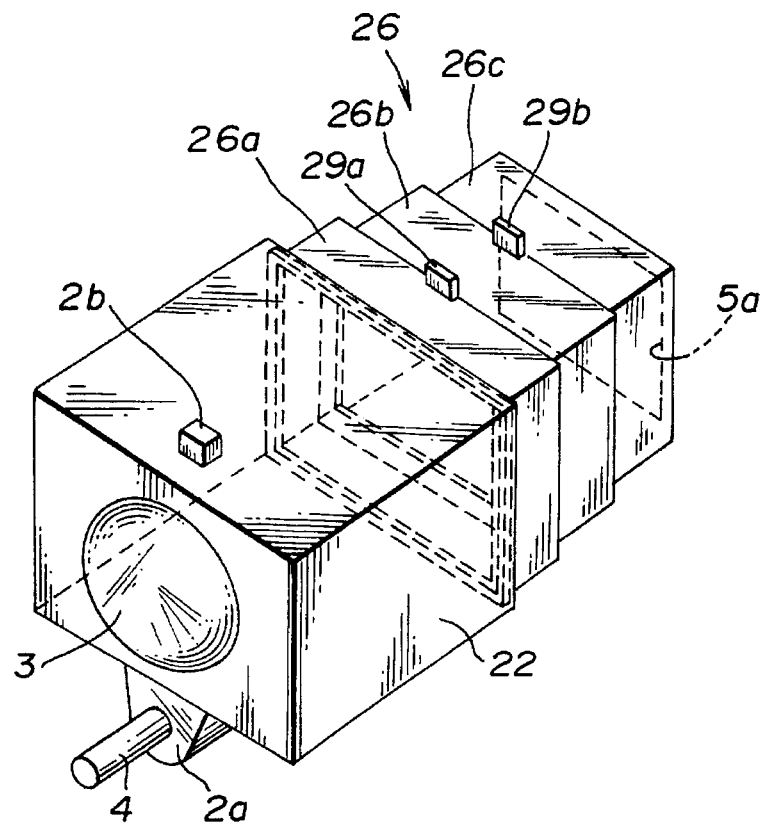
FIG. 5 is a perspective view of light-shield means for coupling a lens barrel and an aperture opening of a camera body in a camera according to a third embodiment of the present invention.
Figure 6:
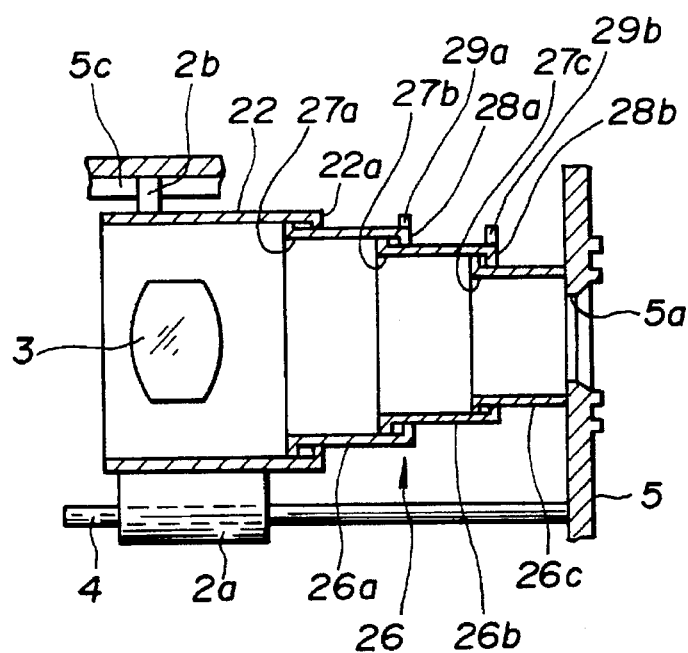
FIG. 6 is a sectional view of the light-shield means for coupling the lens barrel and the aperture opening of the camera body in the camera according to the third embodiment.

FIGS. 5 and 6 show a third embodiment of the present invention. In the third embodiment, identical parts to those in the above first and second embodiments are not explained here and only a points of difference therefrom will be primarily described below.

A lens barrel 22 of this third embodiment is substantially in the form of a rectangular parallelepiped which has a cross-sectional shape taken in a plane vertical to the optical axis that is larger than the aperture opening 5a of the camera body 5, with an inner flange 22a formed at its rear end in the direction of the optical axis. The structural relationship of coupling the above lens barrel 22 and the aperture opening 5a of the camera body 5 by light-shield means 26 is basically the same as in the above first embodiment.

The light-shield means 26 comprises a plurality of light-shield cylinders coupled to each other; for example, three light-shield cylinders 26a, 26b, 26c which are telescopically fitted to each other and whose cross-sectional areas vertical to the optical axis are gradually reduced in the direction from the lens barrel 22 toward the aperture opening 5a.

These light-shield cylinders 26a, 26b, 26c are each a short tubular member being substantially rectangular in cross-section perpendicular to the optical axis, and include respectively outer flanges 27a, 27b, 27c at their one ends, while inner flanges 28a, 28b are provided respectively at the other ends of the light-shield cylinders 26a, 26b. The other end of the light-shield cylinder 26c is connected to the camera body 5 in a light-tight manner and has no inner flange formed there.

Further, the light-shield cylinder 26a has an engagement boss 29a provided on an outer circumferential surface at its rear end, and the light-shield cylinder 26b has an engagement boss 29b provided on an outer circumferential surface at its rear end. When the lens barrel 22 is moved rearward along the optical axis for contracting the light-shield means 26, the lens barrel 22 is first slid upon the light-shield cylinder 26a in overlapped relation until the rear end of the lens barrel 22 is brought into abutment against the engagement boss 29a. Next, the lens barrel 22 and the light-shield cylinder 26a are moved together and the rear end of the light-shield cylinder 26a is brought into abutment against the engagement boss 29b. When the lens barrel 22 and the three light-shield cylinders 26a, 26b, 26c are all fully overlapped one around another, the light-shield means 26 comes into a most contracted state.

On the other hand, when the lens barrel 22 is moved forward along the optical axis for extending the light-shield means 26, the lens barrel 22 is first advanced with respect to the light-shield cylinder 26a until the inner flange 22a of the lens barrel 22 of its rear end is brought into abutment against the outer flange 27a of the light-shield cylinder 26a, followed by unitary movement of the lens barrel 22 and the light-shield cylinder 26a. Then, the inner flange 28a is brought into abutment against the outer flange 27b and, thereafter, the inner flange 28b is brought into abutment against the outer flange 27c. In this way, the light-shield means 26 is extended progressively.

The light-shield cylinders 26a, 26b, 26c and the lens barrel 22 are coupled to each other in a light-tight manner with combination of the outer flange and the inner flange. When the lens barrel 22 is moved upon operations such as zooming and focusing, the light-shield cylinders 26a, 26b, 26c are moved forward or rearward in the direction of the optical axis correspondingly while maintaining the light-tight condition.

The third embodiment thus constructed can also provide substantially similar advantages as in the above first and second embodiments. In addition, since the light-shield cylinder close to the aperture opening has a cross-sectional area perpendicular to the optical axis which is smaller in a like shape than that of the light-shield cylinder close to the lens barrel, this embodiment is suitable for mounting the lens barrel with a large-aperture lens and also has a high ability of shielding light that enters from the front side. Furthermore, since the light-shield means can be extended and contracted through the plurality of light-shield cylinders arranged in concentrically overlapped relation, the camera of this embodiment can achieve light shielding with a reduced space.

Figure 7:
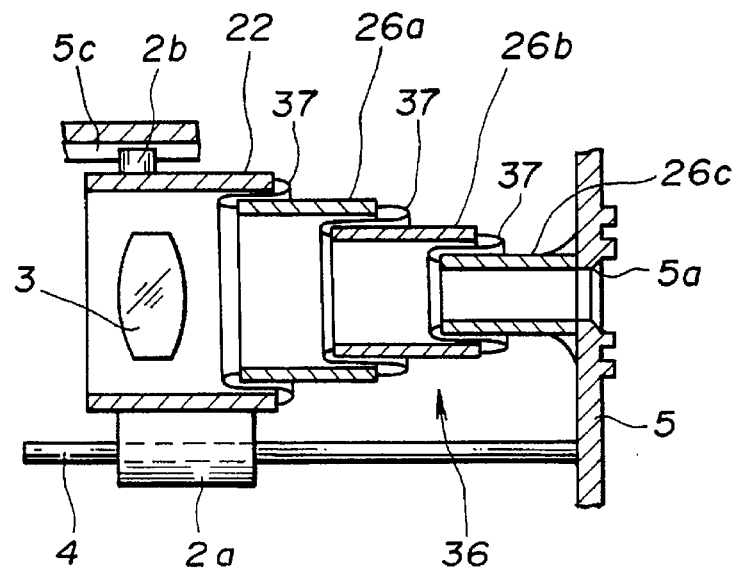
FIG. 7 is a sectional view of light-shield means for coupling a lens barrel and an aperture opening of a camera body in a camera according to a fourth embodiment.

FIG. 7 shows a fourth embodiment of the present invention. In the fourth embodiment, identical parts to those in the above first through third embodiments are not explained here and only points which are different therefrom will be primarily described below.

The fourth embodiment is constructed to be basically the same as the above third embodiment except that light-shield cylinders making up light-shield means 36 are coupled to each other in a light-tight manner by using elastic light-shield members 37 instead of providing the flanges employed in the embodiment of FIGS. 5 and 6. The elastic light-shield members 37 are each made of rubber, sheet, cloth or other material capable of shielding light.

The fourth embodiment thus constructed can also provide substantially similar advantages as in the above first through third embodiments.

Figure 8:
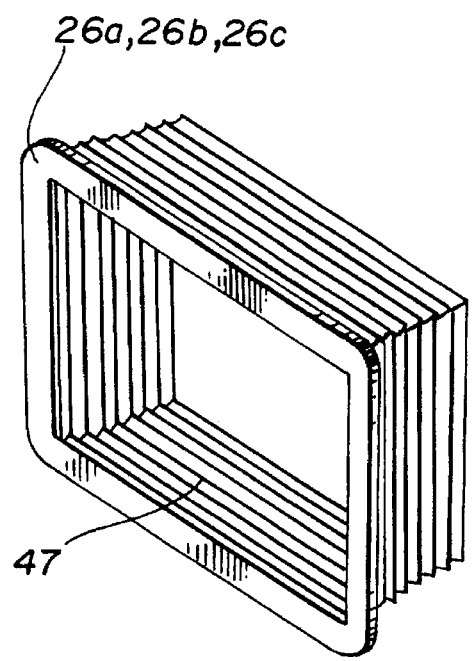
FIG. 8 is a perspective view of light-shield cylinders in a camera according to a fifth embodiment of the present invention.

FIG. 8 shows a fifth embodiment of the present invention. In the fifth embodiment, identical parts to those in the above first through fourth embodiments are not explained here and only points which are different therefrom will be primarily described below.

The fifth embodiment is constructed to be basically the same as the above third embodiment except that each of the light-shield cylinders 26a, 26b, 26c have a plurality of light-shield grooves 47 formed at least in its inner surfaces to serve as means for preventing reflection from the inner surfaces.

The fifth embodiment thus constructed can also provide substantially similar advantages as in the above first through fourth embodiments, as well as an additional superior effect of preventing reflection from the inner surfaces.

Figure 9:
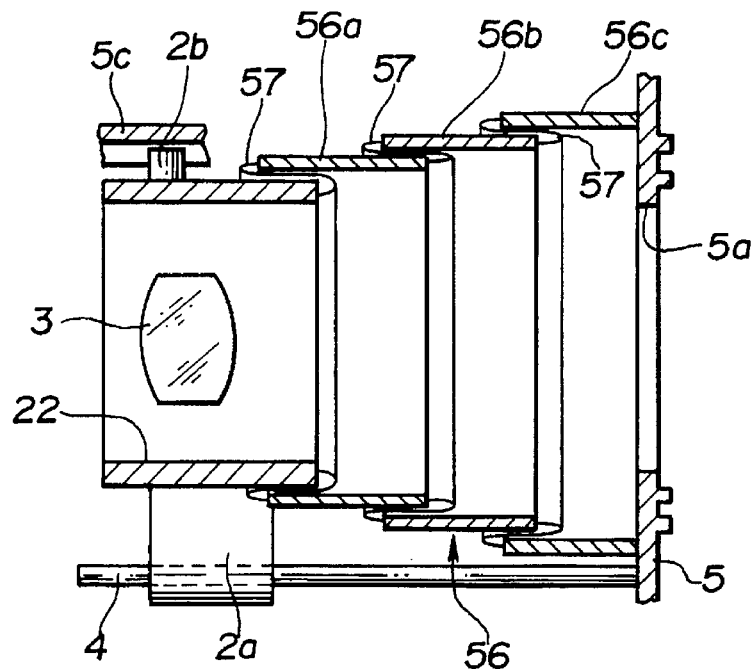
FIG. 9 is a sectional view of light-shield means for coupling a lens barrel and an aperture opening of a camera body in a camera according to a sixth embodiment.

FIG. 9 shows a sixth embodiment of the present invention. In the sixth embodiment, identical parts to those in the above first through fifth embodiments are not explained here and only points of difference therefrom will be primarily described below.

In this sixth embodiment, as opposed to the above fourth embodiment, the light-shield cylinder close to the aperture opening 5a has a cross-sectional area perpendicular to the optical axis which is larger and of a shape similar to that of the light-shield cylinder close to the lens barrel 22.

Specifically, light-shield means 56 comprises a plurality of light-shield cylinders coupled to each other; for example, three light-shield cylinders 56a, 56b, 56c each in the form of a short tubular member which are telescopically fitted to each other and whose cross-sectional areas vertical to the optical axis are gradually increased in the direction from the lens barrel 22 toward the aperture opening 5a.

These light-shield cylinders 56a, 56b, 56c are interconnected by elastic light-shield members 57 to prevent light from leaking, particularly, through the front side. The elastic light-shield members 57 are each made of rubber, sheet, cloth or other material capable of shielding light.

The sixth embodiment thus constructed can also provide substantially similar advantages as in the above first through fifth embodiments.

Figure 10:
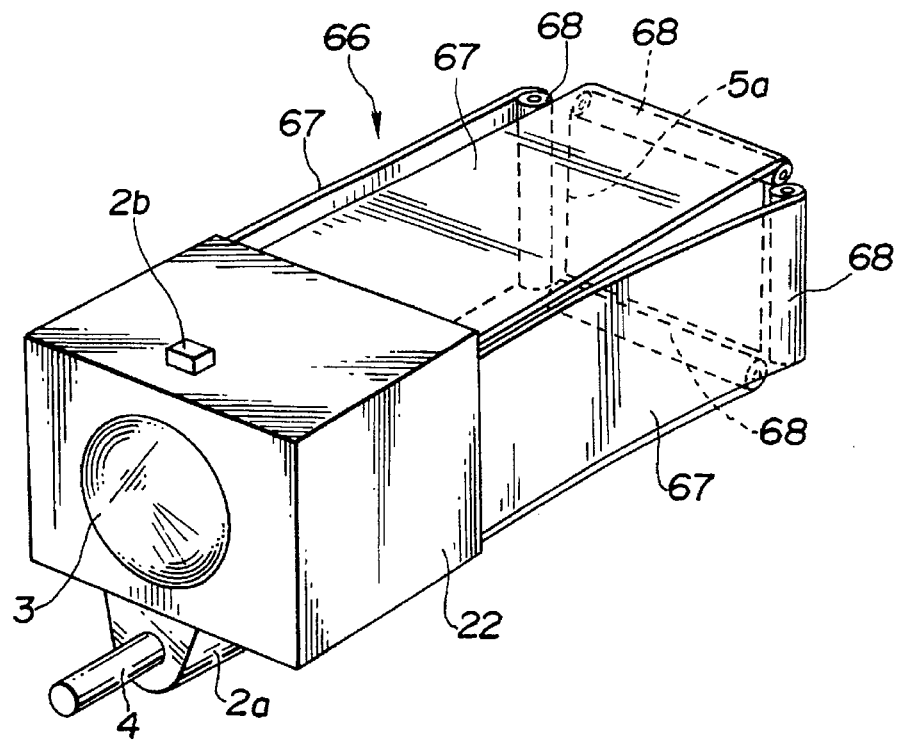
FIG. 10 is a perspective view of light-shield means for coupling a lens barrel and an aperture opening of a camera body in a camera according to a seventh embodiment of the present invention.
Figure 11:
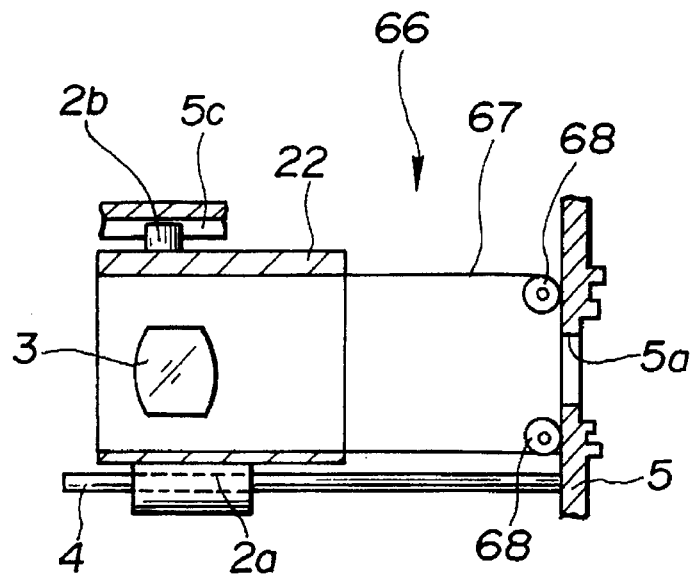
FIG. 11 is a sectional view of the light-shield means for coupling the lens barrel and the aperture opening of the camera body in the camera according to the seventh embodiment.

FIGS. 10 and 11 show a seventh embodiment of the present invention. In the seventh embodiment, identical parts to those in the above first through sixth embodiments are not explained here and only points of difference therefrom will be primarily described below.

The structural relationship of coupling the lens barrel 22 and the aperture opening 5a of the camera body 5 by light-shield means 66 is basically the same as in the above first through sixth embodiment.

The light-shield means 66 is arranged to roll up and unroll elastic members 67 around tubular members 68 corresponding to movement of the lens barrel 22 so that the light-shield means can be extended and contracted.

Specifically, the tubular members 68 for rolling up the sheet-shaped elastic members 67 are attached respectively near four sides of the rectangular aperture opening 5a of the camera body 5, and are always under tension acting in a direction to contract the elastic members 67. Though not shown, adjacent pairs of the elastic member 67 are joined to each other in a light-tight manner by another light-shield member.

The elastic members 67 are each attached at its one end to the lens barrel 22 in a light-tight manner. When the lens barrel 22 is moved in the direction of the optical axis, the elastic members 67 are withdrawn from the tubular members 68 or rolled up around the tubular members 68 correspondingly in the same direction.

The elastic members 67 are each made of rubber, sheet, cloth or other material capable of shielding light, and the lens barrel 22 is also always urged rearward in the direction of the optical axis under tension acting on the tubular members 68 to roll up the elastic members 67, whereby the lens barrel 22 is prevented from wobbling.

The seventh embodiment thus constructed can also provide substantially similar advantages as in the above first through sixth embodiments, as well as an additional advantage of properly positioning the lens barrel 22.

Figure 12:
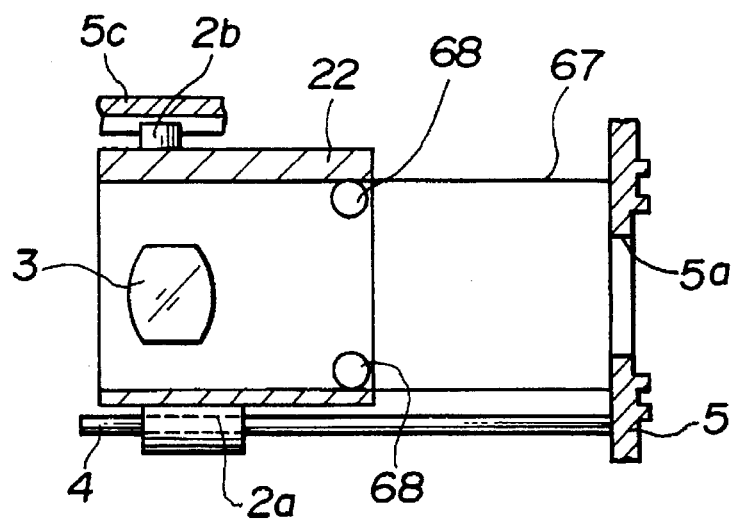
FIG. 12 is a sectional view of light-shield means for coupling a lens barrel and an aperture opening of a camera body in a camera according to an eighth embodiment.

FIG. 12 shows an eighth embodiment of the present invention. In the eighth embodiment, identical parts to those in the above first through seventh embodiments are not explained here and only a different points of difference therefrom will be primarily described below.

In this eighth embodiment, as opposed to the above seventh embodiment, the tubular members 68 are attached to the lens barrel 2, and the elastic members 67 are each attached at its one end to the camera body 5 in a position near a corresponding side of the aperture opening 5a in a light-tight manner.

The eighth embodiment thus constructed can also provide substantially similar advantages as in the above seventh embodiment.

Figure 13:
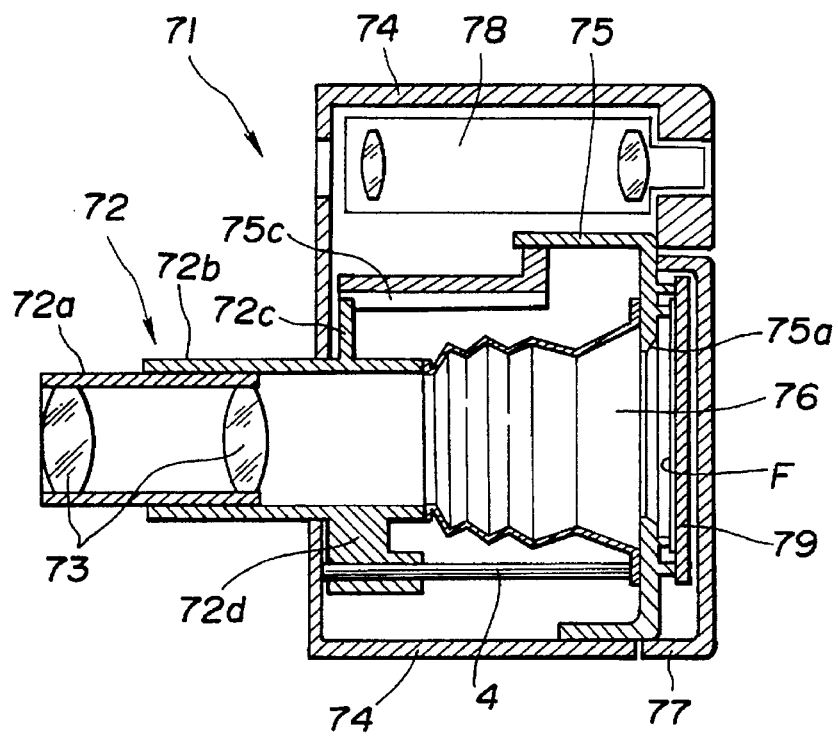
FIG. 13 is a longitudinal sectional view taken along an optical axis of a camera according to a ninth embodiment.

FIG. 13 shows a ninth embodiment of the present invention. In the ninth embodiment, identical parts to those in the above first through eighth embodiments are not explained here and only points of difference therefrom will be primarily described below.

A camera 71 of this ninth embodiment comprises a camera body 75 covered by a casing member 74 and closed at its rear opening by a back lid 77 in a light-tight manner, a lens barrel 72 projecting forwardly of the camera body 75, and a finder unit 78 disposed in an upper portion of the camera body 75.

The lens barrel 72 comprises an inner cylinder 72a in which photographing lenses 73 are built in, and an outer cylinder 72b fitted over an outer circumference of the inner cylinder 72a with its part projecting into the camera body 75. The lens barrel 72 is movable in the direction of the optical axis. Specifically, the inner tube 72a is made movable with respect to the outer tube 72b in the direction of the optical axis, and the outer tube 72b is made movable with respect to the camera body 75 in the direction of the optical axis.

The outer tube 72b has an engagement boss 72c on its upper circumferential surface which engages in a guide groove 75c of the lens body 75 to restrict movement of the lens barrel 72 for preventing it from turning about the optical axis when shifted forward, and a projection 72d on its lower circumferential surface through which a support shaft 4 is inserted so as to guide the lens barrel 72 in the direction of the optical axis.

The lens barrel 72 and the aperture opening 75a of the camera body 75 are coupled to each other by bellows-shaped light-shield means 76 in a light-tight manner. The light-shield means 76 is of substantially the same structure as the light-shield means 6 described above in connection with the first embodiment, and can be extended and contracted in the direction of the optical axis.

Note that while the light-shield means in the above first embodiment is used as the light-shield means 76 in this ninth embodiment, any of the other light-shield means in the second through eighth embodiments is also easily applicable.

Inside the back lid 77, there is disposed a pressure plate 79 which is urged by an elastic member or the like to hold a film F between itself and a pair of film rails disposed respectively on the upper and lower sides of the aperture opening 75a so that flatness of the film under exposure is increased.

The ninth embodiment thus constructed can also provide substantially similar advantages as in the above first through eighth embodiments, as well as an additional advantage of realizing the camera having a neat appearance because the complex configuration of the light-shield means is not visible from the exterior.

Figure 14:
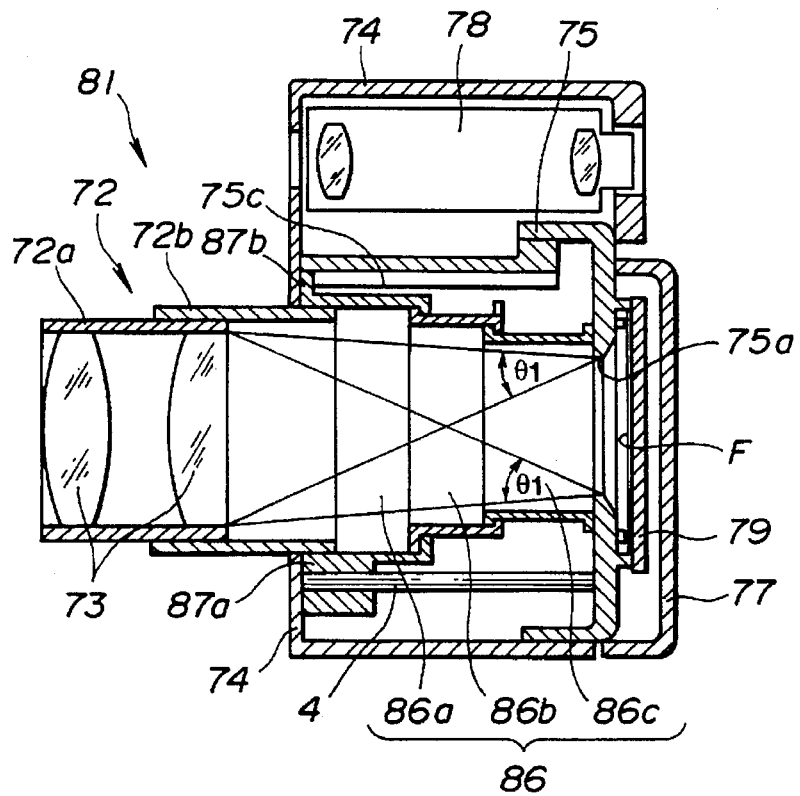
FIG. 14 is a longitudinal sectional view taken along an optical axis of a camera according to a tenth embodiment.

FIG. 14 shows a tenth embodiment of the present invention. In the tenth embodiment, identical parts to those in the above first through ninth embodiments are not explained here and only a different point therefrom will be primarily described below.

A camera 81 of this tenth embodiment is constructed to be basically the same as the above ninth embodiment except that light-shield means 86 is of substantially the same structure as the light-shield means 26 in the above third embodiment.

Specifically, the light-shield means 86 comprises three light-shield cylinders 86a, 86b, 86c which are structurally substantially similar to the light-shield cylinders 26a, 26b, 26c in the third embodiment and are coupled to each other in a light-tight manner with the aid of engagement flanges.

The light-shield cylinder 86a has an engagement boss 87b on an upper circumferential surface of its front portion along the optical axis, which boss engages in the guide groove 75c of the lens body 75 to restrict movement of the light-shield cylinder 86a, and a projection 87a on its lower circumferential surface through which the support shaft 4 is inserted.

Furthermore, in the tenth embodiment, since the cross-sectional area of the light-shield means 86 vertical to the optical axis is larger in the position closer to the lens barrel 72 than the position closer to the aperture opening 75a, an angle viewing from an image point on the film F to the exit pupil of the photographing lenses 73, i.e., an angle θ1 formed by the photographing light as indicated in FIG. 14, can be increased. Therefore, this embodiment is suitable for a bright lens having a large aperture.

The tenth embodiment thus constructed can also provide substantially similar advantages as in the above first through ninth embodiments, as well as an additional advantage of presenting the light-shield means suitable for use with a large-aperture lens.

In this invention, it is apparent that working modes different in a wide range can be formed on the basis of this invention without departing from the spirit and scope of the invention. This invention is not restricted by any specific embodiment except as may be limited by the appended claims.

What is claimed is:

1. A camera in which a space between an aperture opening formed in a camera body and a movable lens barrel including a photographing lens built therein is shielded against light in a light-tight manner, comprising:

light-shield means disposed to couple the aperture opening of said camera body and said lens barrel to each other, said light-shield means having bellows including a plurality of folding parts joined together and being extensible and contractible in unison with movement of said lens barrel; and wire-like shape retaining means disposed in said folded parts in said bellows, preventing said bellows from collapsing and from thereby interfering with a flux of photographing light upon its flexion.

2. A camera according to claim 1, wherein said shape retaining means exerts a force for urging said light-shield means in a direction of an optical axis of said lens barrel.

3. A camera according to claim 1, wherein said light-shield means has a cross-sectional shape perpendicular to an optical axis of said lens, which changes gradually from a substantially rectangular shape to a substantially circular shape moving in a direction from said aperture opening toward said lens barrel.

4. A camera in which a space between an aperture opening formed in a camera body and a movable lens barrel including a photographing lens built therein is shielded against light in a light-tight manner, comprising:

light-shield means disposed to couple the aperture opening of said camera body and said lens barrel to each other, said light-shield means being extensible and contractible in unison with movement of said lens barrel and being prevented form interfering with a flux of photographing light upon its flexion, and said light-shield means comprising a bellows member which is folded to have top and bottom creases arranged in a spiral form, and a spiral-shaped skeleton member disposed along a portion of said bellows member which defines a top crease when folded.

5. A camera according to claim 4, wherein said skeleton member is a coiled elastic member.

6. A camera according to claim 4, wherein said light-shield means has a cross-sectional shape perpendicular to an optical axis of said lens, which changes gradually from a substantially rectangular shape to a substantially circular shape as an axial position approaches said lens barrel from said aperture opening.

7. A camera in which a space between an aperture opening formed in a camera body and a movable lens barrel including a photographing lens built therein is shielded against light in a light-tight manner, comprising:

light-shield means disposed to couple the aperture opening of said camera body and said lens barrel to each other, said light-shield means being extensible and contractible in unison with movement of said lens barrel and being prevented from interfering with a flux of photographing light upon its flexion, and said light-shield means comprising a bellows member which is folded to have top and bottom creases arranged side by side successively, and a plurality of one of ring-shaped and rectangular-shaped skeletal members disposed in portions of said bellows member which define the top creases when the bellows member is folded.

8. A camera according to claim 7, wherein said light-shield means is formed of a sheet capable of shielding light.

9. A camera according to claim 7, wherein said light-shield means has a cross-sectional shape perpendicular to an optical axis of said lens, which changes gradually from a substantially rectangular shape to a substantially circular shape moving in a direction from said aperture opening to said lens barrel.

10. A camera in which a space between an aperture opening formed in a camera body and amovable lens barrel including a photographing lens built therein is shielded against light in a light-tight manner, comprising:

light-shield means disposed in said camera body being extensible and contractible in unison with movement of said lens barrel, said light-shield means comprising a plurality of light-shield cylinders which are extended and contracted in unison with movement of said lens barrel such that said light-shield cylinders are telescopically fitted to each other in an overlapped state when contracted, and are successively withdrawn from the overlapped state when extended; and cross-sectional areas, perpendicular to an optical axis of said lens, of said plurality of light-shield cylinders making up said light-shield means being selected to be smaller in a light-shield cylinder closer to said aperture opening than in a light-shield cylinder closer to said lens barrel.

11. A camera in which a space between an aperture opening formed in a camera body and a movable lens barrel including a photographing lens built therein is shielded against light in a light-tight manner, comprising:

light-shield means being extensible and contractible in unison with movement of said lens barrel, and said light-shield means comprising sheet-shaped sheet members each having one end attached to one side of said aperture opening or said lens barrel, and roll-up members disposed on the other side of said aperture opening or said lens barrel and attached to the other ends of said sheet member, said roll-up members being urged by forces acting in directions to roll up said sheet members.

12. A camera including a photographing optical system, comprising:

a movable lens barrel capable of moving in a direction of an axis of photographing light passing through said photographing optical system, a camera body having an opening through which the photographing light passing through said photographing optical system is exposed to a photographing film, and light-shield members being fully enclosed in said camera body even when fully extended to couple said movable lens barrel and said camera body, including the opening of said camera body, for covering a space between said movable lens barrel and said camera body in a light-tight manner, said light-shield members being formed of elastic material that allows said movable lens barrel to move in the direction of the axis of the photographing light.

13. A camera according to claim 12, wherein said elastic material is made of rubber.

* * * * *